(12) United States Patent
Tsai et al.

(10) Patent No.: US 8,228,807 B2
(45) Date of Patent: Jul. 24, 2012

(54) METHOD AND APPARATUS FOR SCANNING CHANNELS IN WIRELESS LOCAL AREA NETWORK

(75) Inventors: Cheng Lung Tsai, Hsinchu County (TW); Sung Chien Tang, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 294 days.

(21) Appl. No.: 12/507,949

(22) Filed: Jul. 23, 2009

(65) Prior Publication Data

US 2010/0208598 A1      Aug. 19, 2010

(30) Foreign Application Priority Data

Feb. 17, 2009   (TW) ................................ 98104908 A

(51) Int. Cl.
  *H04L 1/00*  (2006.01)
(52) U.S. Cl. ...... 370/250; 370/338; 455/450; 455/452.1
(58) Field of Classification Search .................. 370/250, 370/338; 455/452.1, 450
  See application file for complete search history.

(56) References Cited

U.S. PATENT DOCUMENTS

2005/0245269 A1* 11/2005 Demirhan et al. ......... 455/452.1
2007/0149230 A1*  6/2007 Song et al. ................... 455/515
2008/0096572 A1*  4/2008 Hsu et al. ..................... 455/450

OTHER PUBLICATIONS

Office Action issued on Nov. 16, 2011 from the Chinese counterpart application 200910009567.4.

\* cited by examiner

*Primary Examiner* — Nittaya Juntima
*Assistant Examiner* — Wanda Russell
(74) *Attorney, Agent, or Firm* — WPAT, P.C.; Anthony King

(57) ABSTRACT

Instead of scanning all the channels at once, the present method separates a channel scanning procedure into multiple channel scanning operations. The method reduces a data loss rate during the operation by returning to the operating channel an associated access point operates on in accordance with a return period for transceiving blocked packets.

12 Claims, 3 Drawing Sheets

METHOD AND APPARATUS FOR SCANNING CHANNELS IN WIRELESS LOCAL AREA NETWORK

BACKGROUND OF THE INVENTION

1. Field of the Invention

The present invention relates to a communication system, and more particularly, to a method and apparatus for scanning channels in wireless local area networks.

2. Description of the Related Art

Wireless local area network (WLAN) technology is now popularly used in various applications. Numerous organizations devote extensive resources to research seeking improvements in WLAN data communication quality. In a WLAN, a wireless transmit/receive unit (WTRU) may be located within communication ranges of several access points (APs). However, the AP associated with the WTRU and the channel the WTRU operates on may change over time due to signal strength variations. On the other hand, when the WTRU roams among various APs, the channel utilized may be adjusted in accordance with a location of the WTRU and the signal quality. FIG. 1 illustrates a circumstance in which a station 13 roams from the communication range of an AP 11 to the communication range of an AP 12. For the roaming, before the station 13 can be associated with the AP 12, a handoff procedure has to be performed. The handoff procedure includes a scanning phase, an authentication phase and a re-association phase, and the scanning phase incurs significant delay.

According to the IEEE 802.11 standard, the scanning phase scans all channels in order to determine which channels a station can utilize. The two currently available modes for scanning are active scanning and passive scanning. For active scanning, a station selects a channel and sends a broadcast probe request frame and then waits a predetermined period of time. If no "probe response frame" is transmitted by the AP(s) in response to the probe request frame within the predetermined period of time, the station selects a next channel and repeats the procedure.

For passive scanning, a station simply goes to the channel of interest and passively listens for the periodic beacon frames sent out by AP(s) (if any). If no periodic beacon frame is transmitted by the AP(s) within a predetermined period of time, the station selects a next channel and repeats the passive scanning operation.

However, operations of transceiving packet will be interrupted whether active scanning or passive scanning is utilized. Take, for example, a dual-band, e.g. 2.4 GHz and 5 GHz, station that requires 140 ms to scan each channel. Such a dual-band station operating on 38 operation channels would need 5320 ms to scan all the channels. That is, the station has to stop communicating with an AP for 5320 ms in order to complete the operation of scanning all channels. Because the data forwarding and data receiving operations are interrupted during this period, important packets could be lost. Therefore, a new method for channel scanning procedures that improves lost-data rates while scanning is needed by the market.

SUMMARY OF THE INVENTION

The channel scanning method and apparatus in accordance with the present invention separate a channel scanning procedure into multiple channel scanning operations and returns to an original channel in accordance with the return period for transceiving blocked packets, and further reduces the rate of data loss during the scanning operations. The word "transceiving" means transmitting and/or receiving.

One embodiment of the present invention discloses a channel scanning method applied in a wireless local area network including a station and at least one AP associated with the station, comprising the steps of: scanning a plurality of channels to be scanned; and returning to an original channel in accordance with a return period for transceiving blocked packets within a stay period, wherein the blocked packets are caused by scanning operations.

Another embodiment of the invention discloses a channel scanning apparatus applied in a wireless local area network comprising a scanning unit, a decision unit, a transceiver unit and a setting unit. The scanning unit is utilized for scanning channels in accordance with settings of a start-up channel and a plurality of channels to be scanned. The decision unit is utilized for making a decision whether or not to return to an original channel in accordance with a return period. The transceiver unit is utilized within a stay period for transceiving the packets that are blocked during scanning operations. The setting unit is utilized to set a plurality of parameters of the station, wherein the parameters comprise the return period, the stay period, the channels to be scanned and the start-up channel. The word "transceiver" means a transmitter and/or receiver.

BRIEF DESCRIPTION OF THE DRAWINGS

The invention will be described according to the appended drawings in which.

PREFERRED EMBODIMENT OF THE PRESENT INVENTION

Figure 1:
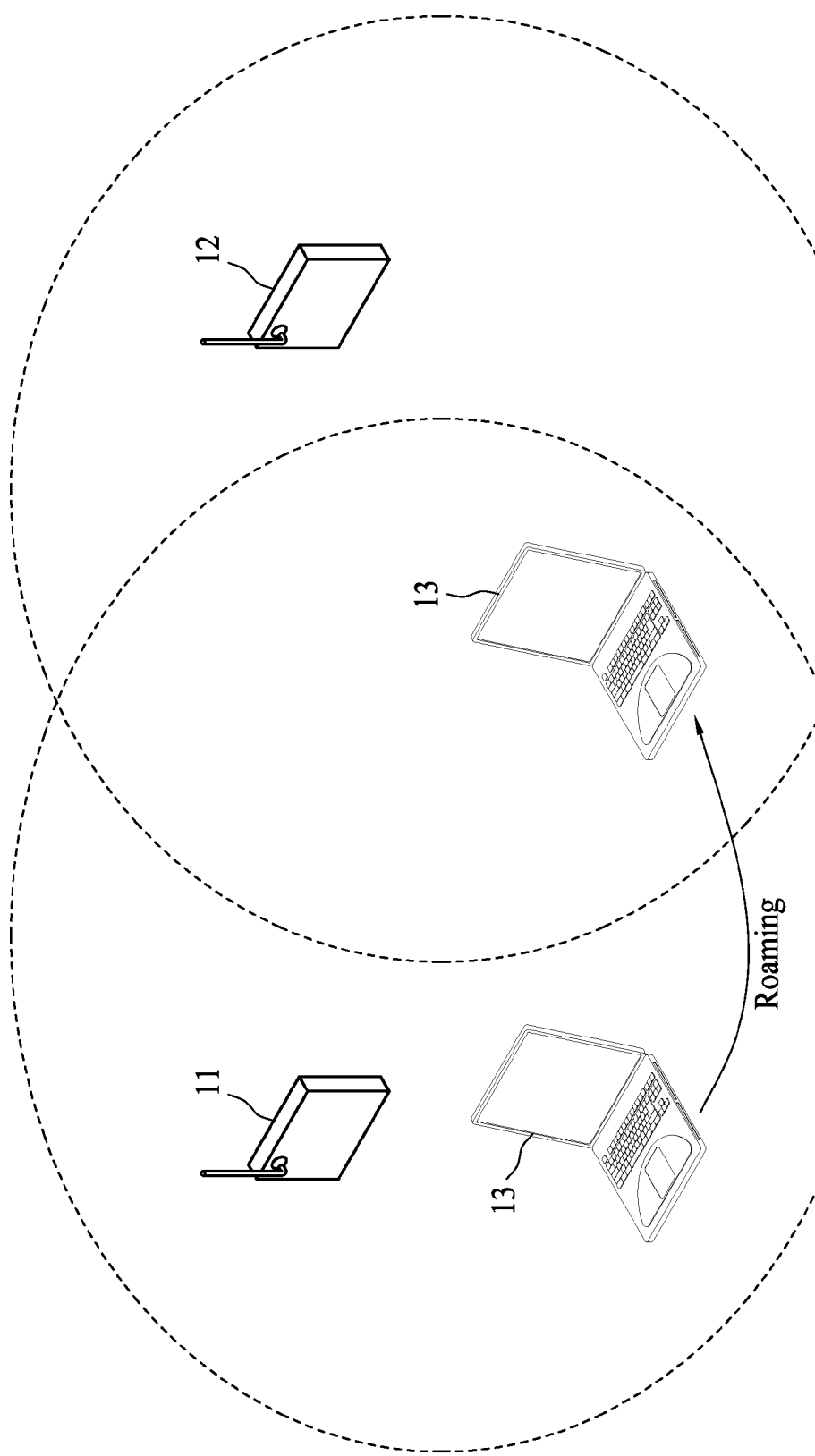
FIG. 1 illustrates a circumstance in which a station roams from the communication range of one AP to the communication range of another AP.
Figure 2:
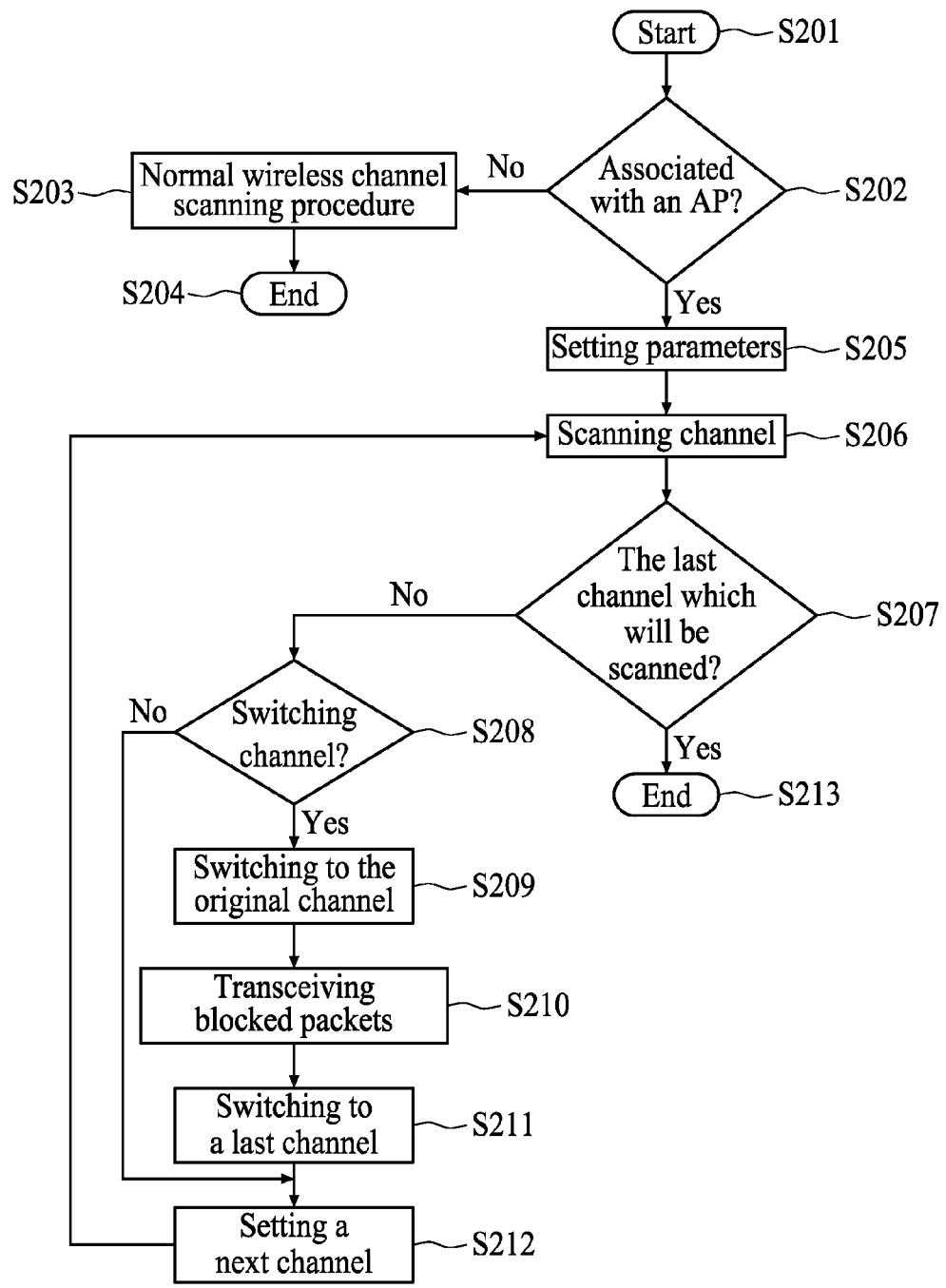
FIG. 2 shows a flowchart illustrating the preferred embodiment of the scanning method of the present invention.

FIG. 2 is a flowchart illustrating the preferred embodiment of the scanning method of the present invention. At step S201, a station starts a channel scanning procedure. At step S202, the station is checked to determine whether it is associated with an AP. At step S203, a normal wireless channel scanning procedure is performed to scan all channels without any interruption. After completing the operation of scanning all the channels, the normal wireless channel scanning procedure is ended at step S204. If the station is associated with an AP, channels to be scanned, a return period and a stay period are set at step S205, wherein the channels to be scanned comprise a start-up channel. The start-up channel of the station depends on the frequency the station utilizes and user settings. For example, the start-up channels for 2.4 GHz stations and 5 GHz stations are channel 1 and channel 36 respectively. Moreover, if the return period is set at 7, then upon scanning every seven channels, the current operating channel the AP is currently operating on is changed to the original channel the station and the AP originally operated on for communication. At step S206, the channel scanning procedure is started from the start-up channel. After completing a scanning operation for a channel, at step S207 the channel is checked to determine whether it is the last channel to be scanned. If it is, then the channel scanning procedure is ended at step S213. At step S208, the return period is checked to determine whether the station switches from the current operating channel to the original channel. If it does not, a next channel to be scanned is set at step S212. If it does, the station switches from the channel to the original channel at step S209. At step S210, the station forwards the packets that are blocked during scanning operations. After transceiving within the stay period, at step S211, the station switches from the original channel to the last channel which is the last channel scanned in the previous scanning operation. At step S212, the next channel to be scanned is set. Steps S207-S212 are repeated without checking all channels to be scanned. The word "transceiving" means transmitting and/or receiving. In particular, the scanning process is performed to scan all channels to be scanned without any interruption if the station is not associated with the AP; and the scanning process is performed to scan a portion of the channels to be scanned if the station is associated with the AP.

Two modes of scanning, active scanning and passive scanning, can be used for the embodiment. For active scanning operation, the station selects channels in order and sends a broadcast probe request frame and then waits the stay period, during which the channels can be utilized by the WLAN card of the station. The stay period set for active scanning is around 30 ms. For passive scanning operation, the station goes to the channels in order and waits for the periodic beacon frames. The stay period set for passive scanning is around 140 ms. The stay period can be adjusted in accordance with the time interval of the frame forwarding between the station and the AP.

In addition to the above-mentioned method, an apparatus for scanning channels in accordance with another embodiment is described as follows to enable those skilled in the art to practice the present invention.

Figure 3:
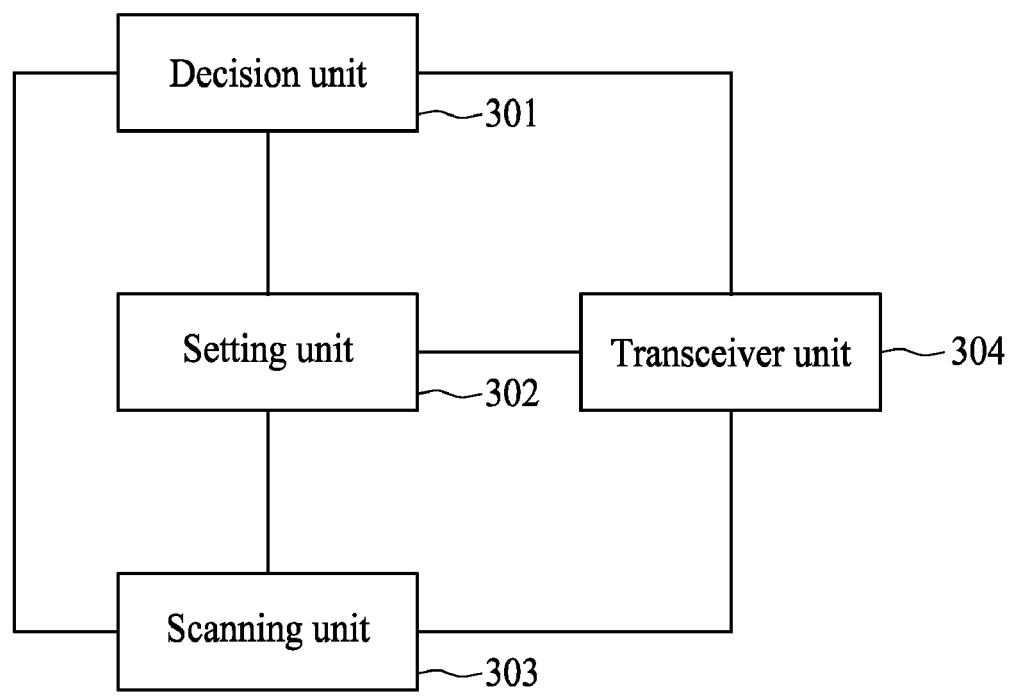
FIG. 3 shows a block diagram of the apparatus for scanning channels in a WLAN in accordance with another embodiment of the invention.

FIG. 3 is a block diagram of the apparatus for scanning channels in a WLAN in accordance with another embodiment of the present invention. The channel scanning apparatus 300 comprises a decision unit 301, a setting unit 302, a scanning unit 303 and a transceiver unit 304. The transceiver 304 may be a transmitter and/or receiver. The setting unit 302 is utilized for setting a plurality of channels which will be scanned; a start-up channel, a return period and a stay period are set at step S205, wherein a plurality of channels are channels the station can operate on. The station can be any form of device which can be utilized in WLAN. These devices could be a laptop with an embedded WLAN modem or a personal digital assistant (PDA) with an embedded WLAN modem. The scanning unit 303 set in active scanning mode or passive scanning mode starts to scan the channels in order from the start-up channel. For active scanning operation, the scanning unit 303 selects the channels in order and sends a broadcast probe request frame. The stay period set for active scanning is around 30 ms. For passive scanning operation, the scanning unit 303 goes to the channels in order and waits for the periodic beacon frames sent out by AP(s), if any. The stay period set for passive scanning is around 140 ms. In addition, the decision unit 301 makes a decision in accordance with the return period whether to switch from the current channel to an original channel. The original channel is the channel the station and an AP originally utilized for communication. The AP can be any form of interface device. The transceiver unit 304 forwards or receives the packets that are blocked during scanning operations during the stay period. The above-mentioned channel scanning apparatus 300 can be implemented with software or hardware and any of a platform with single processor and a platform with multiple processors.

In summary, the channel scanning method and apparatus in accordance with the invention separate a channel scanning procedure into multiple channel scanning operations and return to the original channel in accordance with the return period for transceiving blocked packets. In contrast to conventional channel scanning methods, the channel scanning method and apparatus in accordance with the invention reduces a data loss rate during the operation while a station completes all channel scanning operations. The channel scanning method and apparatus improves the qualities of services of hypertext transfer protocol (HTTP) or file transfer protocol (FTP).

The above-described embodiments of the present invention are intended to be illustrative only. Numerous alternative embodiments may be devised by persons skilled in the art without departing from the scope of the following claims.

What is claimed is:

1. A method for scanning channels in a wireless local area network, the wireless local area network including a station and at least one access point associated with the station, the method comprising the steps of:

scanning N of M channels to be scanned by the station if the station being associated with the access point, without scanning all M channels to be scanned, wherein N is smaller than M;

returning to an original channel in accordance with a pre-determined return period for transmitting or receiving blocked packets within a pre-determined stay period, wherein the blocked packets are caused by scanning operations; and switching to a predetermined channel in the M channels.

2. The method of claim 1, wherein after the blocked packets are transceived, the operation of scanning a plurality of channels continues.

3. The method of claim 1, further comprising a step of setting a start-up channel.

4. The method of claim 1, wherein if an active scanning mode is utilized for scanning a plurality of channels, the stay period is about 30 ms.

5. The method of claim 1, wherein if a passive scanning mode is utilized for scanning a plurality of channels, the stay period is about 140 ms.

6. The method of claim 1, further comprising the step of setting a plurality of channels to be scanned, the return period and the stay period.

7. An apparatus for scanning channels in a wireless local area network, comprising:

a scanning unit for scanning N channels in accordance with settings of a start-up channel and M channels to be scanned if a station being associated with an access point, without scanning all M channels to be scanned, wherein N is smaller than M;

a decision unit for determining, whether to return to an original channel in accordance with a pre-determined return period; and a transceiver unit configured to transmit or receive packets within a pre-determined stay period, wherein the packets are blocked during scanning operations performed by the scanning unit.

8. The apparatus of claim 7, wherein the channels to be scanned are channels on which a station operates.

9. The apparatus of claim 8, further comprising a setting unit used to set a plurality of parameters of the station, wherein the plurality of parameters comprise the return period, the stay period, a plurality of channels to be scanned and the start-up channel.

10. The apparatus of claim 9, wherein if an active scanning mode is utilized by the setting unit, the stay period is about 30 ms.

11. The apparatus of claim 9, wherein if a passive scanning mode is utilized by the setting unit, the stay period is about 140 ms.

12. The apparatus of claim 7, which is implemented with software, hardware, or a platform with single processor or with multiple processors.

\* \* \* \* \*